G. H. W. LINDHORST.
AUTOMOBILE BRAKE MECHANISM.
APPLICATION FILED NOV. 8, 1917.
1,280,502.
Patented Oct. 1, 1918.
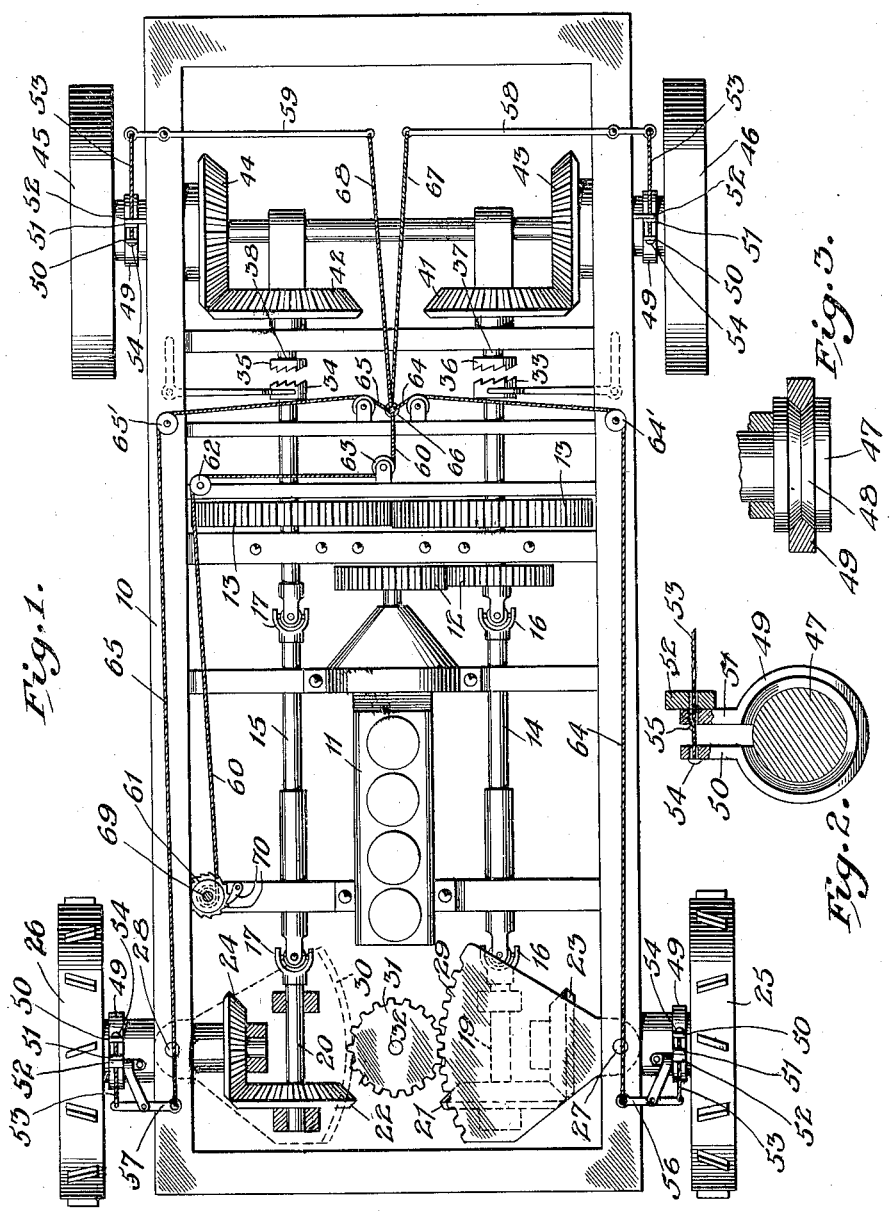
Inventor
George H. W. Lindhorst
By Mason Fenwick & Lawrence,
Attorneys

UNITED STATES PATENT OFFICE.

GEORGE H. W. LINDHORST, OF NISQUALLY, WASHINGTON.

AUTOMOBILE BRAKE MECHANISM.

1,280,502.  Specification of Letters Patent.  Patented Oct. 1, 1918.

Application filed November 8, 1917. Serial No. 200,969.

*To all whom it may concern:*

Be it known that I, GEORGE H. W. LINDHORST, a citizen of the United States, residing at Nisqually, in the county of Pierce and State of Washington, have invented certain new and useful Improvements in Automobile Brake Mechanism; and I do hereby declare the following to be a full, clear, and exact description of the invention, such as will enable others skilled in the art to which it appertains to make and use the same.

This invention relates to motor vehicles, and has for an object to provide a chassis and its brake organization especially designed for but not limited to heavy truck uses.

A further object of the invention is to provide an improved form of brake means for all four of the wheels irrespective of the position of such wheels incident upon turning.

With these and other objects in view, the invention comprises certain novel features of construction, combination, and arrangement of parts as will be hereinafter more fully described and claimed.

In the drawings:

Figure 1 is a top plan view of a chassis, certain parts being broken away for better disclosure of underlying parts.

Fig. 2 is a view of the brake in side elevation, the hub being shown in section, Fig. 3 is a view of the brake substantially in diametrical section, the hub and brake band being shown in elevation.

Like characters of reference designate corresponding parts throughout the several views.

The improved chassis which forms the subject-matter of this application comprises a frame 10, with motor 11 mounted thereon, intergeared through the gears 12 and 13, with the shafts 14 and 15 extending longitudinally of the frame.

Shafts 14 and 15 are telescopic and provided with universal joints 16 and 17 respectively, to permit desired movement of parts. Forwardly of the universal joints 16 and 17 shafts 19 and 20 are journaled, carrying respectively bevel-gears 21 and 22 which interengage with the bevel-gears 23 and 24, controlling and rotating the traction wheels 25 and 26, the latter being mounted to swivel or caster upon pivots 27 and 28 for steering. The castering of the front tractor wheels 25 and 26 upon their pivots 27 and 28 is accomplished by means of segments 29 and 30, carried rigidly upon the said pivots 27 and 28, and said segments controlled by an intermeshing gear 31, carried upon the shaft 32 which is in turn, of course, provided with an ordinary steering wheel not shown.

Adjacent the rear wheels the shafts 14 and 15 are provided with sliding clutch members 33 and 34, positioned to interengage with clutch members 35 and 36 carried respectively upon shafts 37 and 38. Manual levers 39 and 40 are provided for controlling the sliding clutch members 33 and 34, the manual connections of such levers not being shown.

The shafts 37 and 38 have their gears 41 and 42 intermeshing with gears 43 and 44 which are rigidly connected with and control the rotation of traction wheels 45 and 46.

Each of the several traction wheels carries a hub provided with a brake member 47, as shown more particularly at Fig. 3, and each of said brake members is provided with preferably a V-shaped groove or furrow 48 in which is located a brake band 49. The brake band 49 is provided with offsets 50 and 51 spaced apart, one of such offsets being adapted to engage against lugs 52 carried by the frame 10 and by the front wheel hubs as an abutment for the purpose of applying the brakes. A cable 53 is attached to one of the offsets as 50 by any approved means as by the knot or stop 54 and inserted through an eye 55 of the complementary offset 51. The cables 53 from the several brake bands extend respectively to levers 56 and 57, 58 and 59. The levers 56 and 57 are arranged with their axes in front of the pivots 27 and 28; the levers being mounted on the wheel bearings to swing with the wheels as these caster.

A cable 60 is wound about a brake drum 61, and after passing over the pulleys 62 and 63 is connected with the cables 64 and 65 from the levers 56 and 57. The cables 64 and 65 wind about pulleys 64' and 65' each in line with respective pivots 27 and 28 and the ends of levers 56 and 57 so that the cables are not materially affected during castering. The connection between the several cables is shown at 66. Other cables 67 and 68 from the levers 58 and 59 extend to the connection 66 so that all of the cables 64 and 65, 67 and 68 are connected at 66 with the cable 60, and are therefore under the immediate control of the brake drum 61 which is controlled by means of the shaft 69, pawl and ratchet 70 being provided for maintaining the brake drum in the usual condition of tension. Of course, a brake wheel is employed upon the shaft 69, but is not shown in the drawings. It is obvious, therefore, that by rotating the brake drum 61, the several brake bands 49 are clamped upon the brake members 47 of each of the four wheels, so that the device is not only a four-wheel drive, but also a four-wheel brake.

It is obvious that by actuating the clutch members 33 and 34, the rear wheels are disconnected, and the chassis is driven wholly from the front tractor wheels. It is also obvious that by disconnecting either one of the clutch members 33 and 34, its corresponding wheel is released from the drive and for turning or any other purposes, where found desirable, the wheel is free and may either rotate backwardly while the other rear wheel is being driven forwardly in the act of making a short turn.

What is claimed is:

1. A vehicle chassis comprising a frame, steering wheels at one end and other wheels at the rear end of the frame, brakes provided for each of said wheels, and brake applying means including a drum and a draw-cable attached thereto, a cable for each brake connected to the draw-cable, levers pivoted to the frame and connected to certain of the cables and connected to the rear brakes, guides on the frame for the steering wheel cables, and means to which the latter cables are attached at a point, when the wheels are straight, in a straight line between the axis of the knuckle and the guide of a given wheel.

2. A vehicle chassis comprising a frame, steering wheels at one end and other wheels at the rear end of the frame, brakes provided for each of said wheels, and brake applying means including a drum and a draw-cable attached thereto, a cable for each brake connected to the draw-cable, levers pivoted to the frame and connected to certain of the cables and connected to the rear brakes, guides on the frame for the steering wheel cables, and means to which the latter cables are attached at a point, when the wheels are straight, in a straight line between the axis of the knuckle and the guide of a given wheel, said means including a lever mounted on the swinging wheel bearing and connected to the brake.

In testimony whereof I affix my signature.

GEORGE H. W. LINDHORST.